United States Patent
Jang et al.

(10) Patent No.: US 8,966,142 B2
(45) Date of Patent: Feb. 24, 2015

(54) METHOD AND APPARATUS FOR INPUTTING/OUTPUTTING VIRTUAL OPERATING SYSTEM FROM REMOVABLE STORAGE DEVICE ON A HOST USING VIRTUALIZATION TECHNIQUE

(75) Inventors: Min-sung Jang, Seoul (KR); Seong-yeol Park, Yongin-si (KR); Jae-min Park, Seoul (KR); Sang-Bum Suh, Seoul (KR); Sung-kwan Heo, Seoul (KR); Byung-woan Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 507 days.

(21) Appl. No.: 12/142,406

(22) Filed: Jun. 19, 2008

(65) Prior Publication Data

US 2009/0216916 A1   Aug. 27, 2009

(30) Foreign Application Priority Data

Feb. 27, 2008   (KR) .................. 10-2008-0017888

(51) Int. Cl.
*G06F 15/16* (2006.01)
*G06F 9/00* (2006.01)

(52) U.S. Cl.
USPC .......... 710/62; 710/8; 710/9; 710/10; 710/72; 710/73; 710/74; 713/1; 713/2; 713/100; 707/101; 717/174; 715/789; 715/847

(58) Field of Classification Search
USPC .............. 710/62, 72–74, 8–10; 715/789, 847; 713/1, 2, 100; 718/1; 717/174; 707/101
See application file for complete search history.

(56) References Cited

U.S. PATENT DOCUMENTS

| | | | |
|---|---|---|---|
| 5,555,385 A | | 9/1996 | Osisek |
| 6,405,362 B1* | | 6/2002 | Shih et al. ..................... 717/174 |
| 6,658,526 B2 | | 12/2003 | Nguyen et al. |
| 7,373,656 B2* | | 5/2008 | Lang et al. ........................ 726/3 |
| 7,600,216 B2* | | 10/2009 | Shlomai ......................... 717/111 |
| 7,620,667 B2* | | 11/2009 | Rollin et al. .......................... 1/1 |
| 8,738,786 B2 | | 5/2014 | Lee |
| 8,738,854 B2* | | 5/2014 | Iida ............................... 711/114 |
| 2002/0135613 A1* | | 9/2002 | O'Hara ......................... 345/745 |
| 2004/0068522 A1 | | 4/2004 | Daniels et al. |

(Continued)

FOREIGN PATENT DOCUMENTS

| JP | 333948 A | 2/1991 |
|---|---|---|
| JP | 6-75836 A | 3/1994 |

(Continued)

OTHER PUBLICATIONS

Communication dated Aug. 7, 2012, issued by the Japanese Patent Office in counterpart Japanese Application No. 2010-547554.

(Continued)

*Primary Examiner* — Tammara Peyton
(74) *Attorney, Agent, or Firm* — Sughrue Mion, PLLC

(57) ABSTRACT

A method and apparatus for inputting and outputting data by using a virtualization technique are provided. The method includes generating a virtual operating system (OS) for the external device, which is connected to a host, based on OS information stored in the external device, setting a partial area of a storage of the host as virtual storage for the external device, and storing the data in the virtual storage or a memory of the external device in response to a request for inputting and outputting the data from the virtual OS.

14 Claims, 4 Drawing Sheets

(56) References Cited

U.S. PATENT DOCUMENTS

| | | | |
|---|---|---|---|
| 2004/0068611 A1 | 4/2004 | Jacobson et al. | |
| 2005/0204013 A1* | 9/2005 | Raghunath et al. | 709/217 |
| 2005/0235045 A1* | 10/2005 | Narayanaswami et al. | 709/217 |
| 2006/0015660 A1* | 1/2006 | Nguyen et al. | 710/52 |
| 2007/0209035 A1* | 9/2007 | Sonderegger et al. | 718/1 |
| 2007/0214187 A1* | 9/2007 | Thomas et al. | 707/200 |
| 2008/0120439 A1* | 5/2008 | Kwan et al. | 710/13 |
| 2008/0140691 A1* | 6/2008 | Li et al. | 707/101 |
| 2010/0077396 A1* | 3/2010 | Choi et al. | 718/1 |
| 2010/0146208 A1 | 6/2010 | Nashimoto et al. | |

FOREIGN PATENT DOCUMENTS

| | | | |
|---|---|---|---|
| JP | 9282103 A | 10/1997 | |
| JP | 2006195878 A | 7/2006 | |
| JP | 2007-219877 A | 8/2007 | |
| JP | 2009-518703 A | 5/2009 | |
| JP | 2009-537892 A | 10/2009 | |
| KR | 1020070111603 A | 11/2007 | |
| WO | 2007/057248 A1 | 5/2007 | |
| WO | 2007/136192 A1 | 11/2007 | |

OTHER PUBLICATIONS

K. Suzaki, "Current Implementation of Network Transferable Computer", Electrotechnology Laboratory, Agency of Industrial Science and Technology, Institute of Electronics, Information and Communication Engineers, vol. 100, No. 86, pp. 149-156, May 5, 2000.
Communication dated Jun. 1, 2011 issued by the European Patent Office in counterpart European Patent Application No. 08872870.4.
Communication dated Jan. 15, 2013 issued by the Japanese Patent Office in counterpart Japanese Patent Application No. 2010-547554.
Communication issued Jun. 27, 2014, in corresponding Korean Patent Application No. 10-2008-0017888.

* cited by examiner

METHOD AND APPARATUS FOR INPUTTING/OUTPUTTING VIRTUAL OPERATING SYSTEM FROM REMOVABLE STORAGE DEVICE ON A HOST USING VIRTUALIZATION TECHNIQUE

CROSS-REFERENCE TO RELATED PATENT APPLICATION

This application claims priority from Korean Patent Application No. 10-2008-0017888, filed on Feb. 27, 2008 in the Korean Intellectual Property Office, the disclosure of which is incorporated herein in its entirety by reference.

BACKGROUND OF THE INVENTION

1. Field of the Invention

Methods and apparatuses consistent with the present invention relate to inputting and outputting data, and more particularly, to inputting and outputting data by using a virtualization technique.

2. Description of the Related Art

In a virtualization technique, hardware resources such as a processor, a memory, a network, a device, a function of graphics are virtualized with respect to an operating system (OS). Most OSs operate in a state where the OSs exclusively occupy resources of a computer. Accordingly, it is generally impossible to concurrently execute a plurality of OSs in a computer since OSs installed in the computer compete with one another. In the virtualization technique, a virtual interface is provided between hardware and the OSs. Accordingly, it is possible to concurrently execute the OSs in a computer.

SUMMARY OF THE INVENTION

The present invention provides a method and apparatus for inputting and outputting data so as to improve a speed of inputting and outputting data in a virtual environment and a computer-readable recording medium having embodied thereon a computer program for executing the method.

According to an aspect of the present invention, there is provided a method of inputting and outputting data, the method including: generating a virtual OS for an external device, which is connected to a host, based on OS information stored in the external device; setting a partial area of a storage of the host as a virtual storage for the external device; and storing the data in the virtual storage or a memory of the external device in response to a request for inputting and outputting the data from the virtual OS.

According to another aspect of the present invention, there is provided a computer-readable recording medium having embodied therein a computer program for executing a method of inputting and outputting data, the method including: generating a virtual OS for an external device, which is connected to a host, based on OS information stored in the external device; setting a partial area of a storage of the host as a virtual storage for the external device; and storing the data in the virtual storage or a memory of the external device in response to a request for inputting and outputting the data from the virtual OS According to another aspect of the present invention, there is provided an apparatus for inputting and outputting data, which is connected to a host including a host OS and a host storage, the apparatus including: an application storage unit which stores at least one application; a virtual environment unit which stores user preference information for setting a virtual environment and OS information; a memory; and a virtualization layer which operates so that the data is stored in a virtual storage or the memory in response to a request for inputting and outputting the data of a virtual OS by generating the virtual OS from the host OS based on the OS information and setting a partial area of a storage of the host as the virtual storage

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
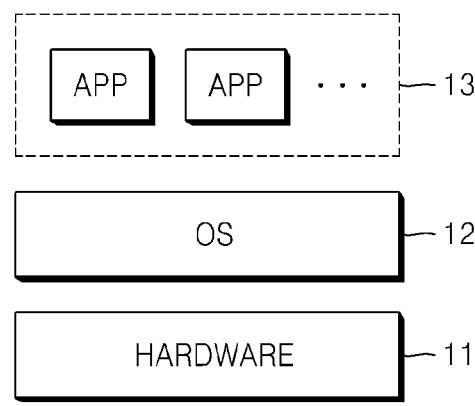
FIG. 1 illustrates a layered structure of a general host computer.

Hereinafter, the present invention will be described in detail by explaining exemplary embodiments of the invention with reference to the attached drawings. Like reference numerals in the drawings denote like elements. Repeated descriptions of the same elements will be omitted.

FIG. 1 illustrates a layered structure of a general host computer.

Referring to FIG. 1, the host computer includes hardware 11, an operating system (OS) 12, and a plurality of applications 13. The hardware 11 may include a central processing unit (CPU), a random access memory (RAM), a read only memory (ROM), a hard disk, and the like. The OS 12 is a program for managing computer resources. The OS 12 serves as an interface between the hardware 11 and the applications 13.

Figure 2:
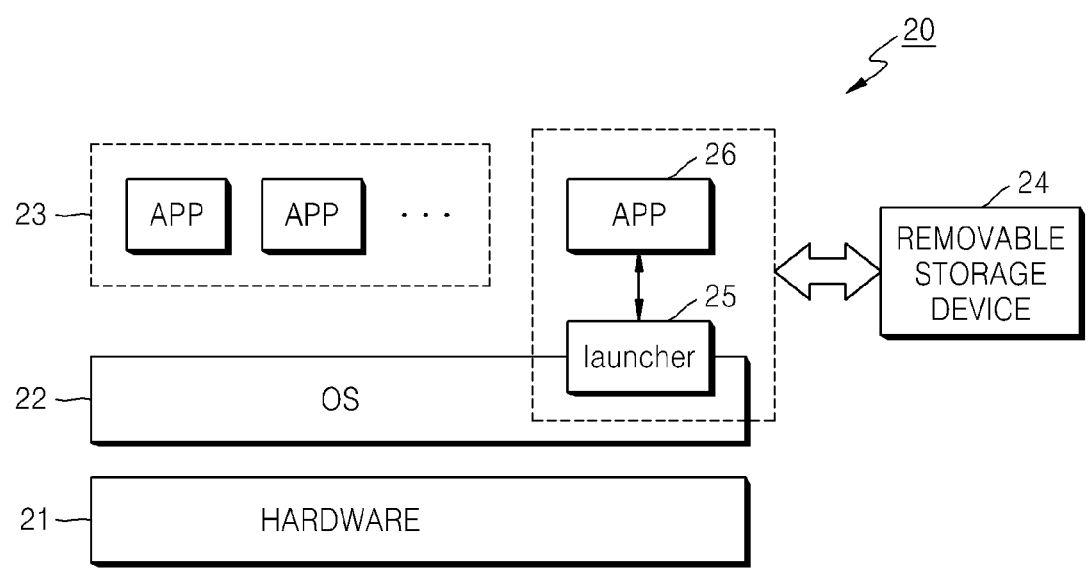
FIG. 2 illustrates a system for inputting and outputting data to which a virtualization technique is not applied.

FIG. 2 illustrates a system for inputting and outputting data to which a virtualization technique is not applied.

Referring to FIG. 2, the system 20 for inputting and outputting data serves to input and output data between the host computer and a removable storage device to which the virtual technique is not applied. The host computer includes hardware 21, an OS 22, and a plurality of applications 23.

A removable storage device 24 includes a launcher 25 and a plurality of applications 26. If the removable storage device is inserted into the host computer, the launcher 25 and the plurality of applications 26 are loaded in a memory of the host computer and executed in the host computer. The launcher 25 is an interface program for establishing an environment in which the applications 26 are executed by setting a user environment stored in the removable storage device in the host computer. Accordingly, in the host computer to which the removable storage device is connected, data is input and output through only the removable storage device instead of a storage device of the host computer.

However, since the removable storage device 24 has a small capacity and low performance as compared with the host computer, it takes more time to input and output data by using the removable storage device as compared with a case where the storage device of the host computer is used to input and output data. For example, a hard disk of the host computer may have a capacity of 500 gigabytes (GB), but a universal serial bus (USB) storage device may have a capacity of 8 GB. Thus, the capacity of the hard disk is considerably greater than that of the USB storage device.

Specifically, in a case where a file that is required to be speedily written and read, such as a temporary Internet file is stored in the removable storage device, an operation of an application is delayed. For example, in a case where a webpage using the Internet is open, it takes much time to store corresponding data in the removable storage device. In addition, in a case where the removable storage device uses a flash memory, a lifetime of the removable storage device may be considerably decreased by successively writing and deleting files having a small size.

Figure 3:
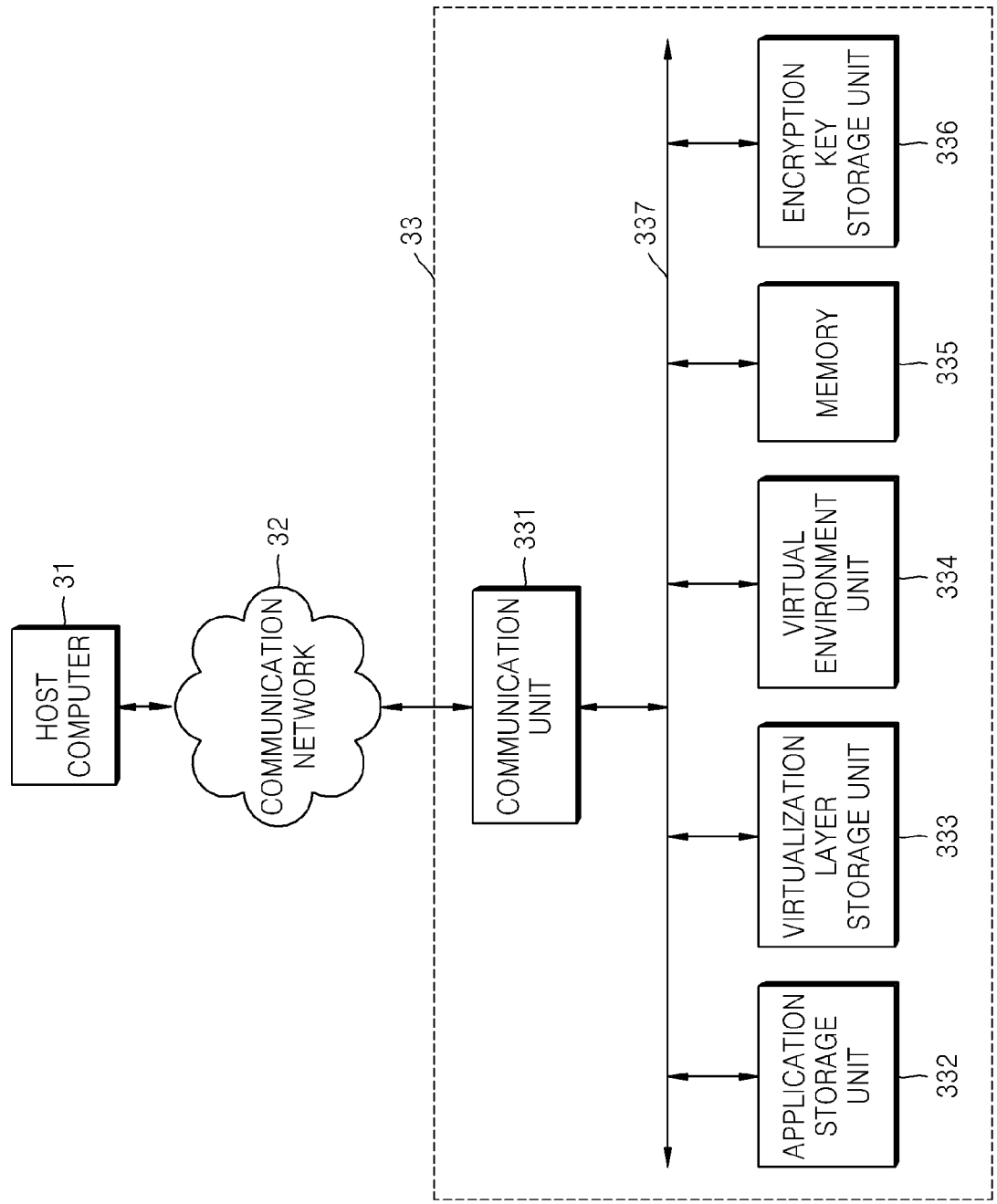
FIG. 3 is a block diagram illustrating a removable storage device according to an exemplary embodiment of the present invention.

FIG. 3 is a block diagram illustrating a removable storage device according to an exemplary embodiment of the present invention.

Referring to FIG. 3, a removable storage device 33 is connected to a host computer 31 through a wired and/or wireless data communication network 32. Here, the removable storage device 33 is only an exemplary embodiment. The present invention may be applied to another device connected to the host computer 31 through a network. Hereinafter, for convenience of description, a USB flash drive that is a USB portable storage device will be described as an example of the removable storage device 33.

The removable storage device 33 includes a communication unit 331, an application storage unit 332, a virtualization layer storage unit 333, virtual environment unit 334, a memory 335, an encryption key storage unit 336, and a communication bus 337.

The communication unit 331 may be embodied as a physical device such as a general interface, so as to function as a unit for communicating with the communication network. The communication bus 337 communicates with various components in the removable storage device, such as the application storage unit 332, the virtualization layer storage unit 333, the virtual environment unit 334, the memory 335, the encryption key storage unit 336, and the communication 331.

The application storage unit 332 stores various applications such as Microsoft Word, Power Point, and the like. If the removable storage device 33 is inserted into the host computer 31, a plurality of applications are loaded in a memory of the host computer 31 and executed in the host computer 31.

The virtualization layer storage unit 333 stores a virtualization layer that is a program for providing a virtual environment. More specifically, the virtualization layer may be a program such as a virtual machine monitor or hypervisor. If the removable storage device 33 is inserted into the host computer 31, the virtualization layer is loaded in the memory of the host computer 31. Accordingly, the virtualization layer is executed in host hardware or a host OS to generate a virtual OS. The virtualization layer provides a virtual environment by providing a resource to the virtual OS.

The virtual environment unit 334 is a database which store user preference information for setting a virtual environment and OS information required so that the virtual OS generates a new user environment. Here, the user preference information may include a desktop, a theme, an icon, a shortcut, a language, a font, and the like. If the removable storage device 33 is inserted into the host computer 31, the environment of the user is established according to the user preference information.

In addition, the OS information required so that the OS generates the new user environment may include a registry, a file system, a component, a dynamic link library (DLL), and the like. If the removable storage device 33 is inserted into the host computer 31, it is possible to establish a virtual environment in which a registry, a file system, a component, a DLL, and the like which are not installed in the host computer 31 exist in a memory of the host computer 31. Here, the registry is a list file of pieces of information generated when Windows is installed. The registry includes properties of hardware, software, a user, a computer, and a network. In addition, the file system includes file names and logical positions of the files so that the files can be stored and searched.

The memory 335 stores data newly generated in a procedure for performing a task by using an application. For example, when the user edits a document by using Microsoft Word, the memory 335 stores changes of the document or a newly written document.

The encryption key storage unit 336 stores a unique encryption key that is set by the user. If the removable storage device 33 is inserted into the host computer 31, the virtualization layer may generate a virtual storage that is accessible by using the virtual OS from the host hardware. In this case, since the generated virtual storage is encrypted by using the encryption key, the host OS cannot access the virtual storage. Accordingly, security of the virtual storage is maintained. In this case, it is possible to encrypt the virtual storage by using unique information of the removable storage device or other information provided by the user.

Figure 4:
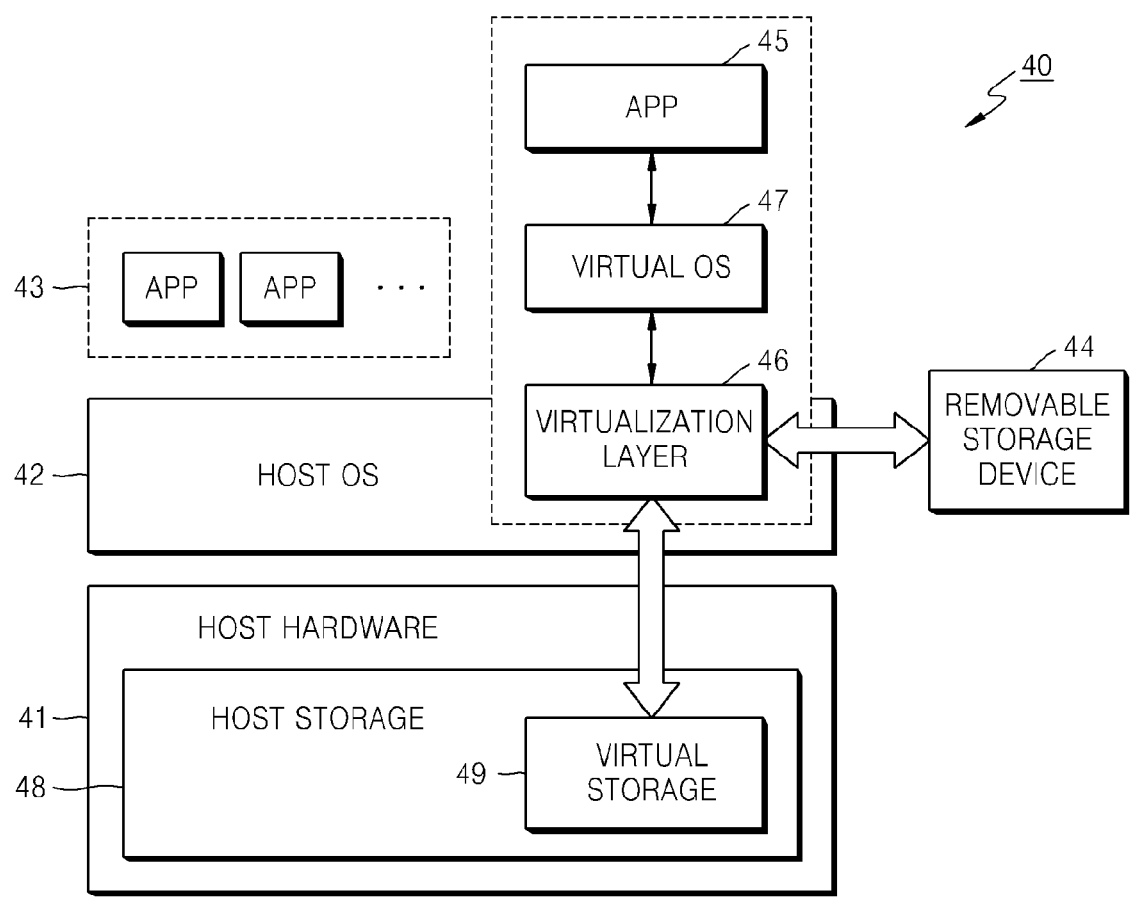
FIG. 4 illustrates a system for inputting and outputting data to which a virtualization technique is applied.

FIG. 4 illustrates a system for inputting and outputting data to which a virtualization technique is applied.

Referring to FIG. 4, a system 40 for inputting and outputting data serves to input and output data between a host computer and a removable storage device by using the virtualization technique is shown. The host computer includes host hardware 41, a host OS 42, and a plurality of applications 43.

The removable storage device 44 includes a plurality of applications 45 and a virtualization layer 46. If the removable storage device 44 is inserted into the host computer, the plurality of applications 45 and the virtualization layer 46 are loaded in a memory of the host computer and executed in the host computer.

The virtualization layer 46 generates a virtual OS 47 from the host OS 42 based on OS information and provides a resource necessary for the virtual OS 47 from the host computer. More specifically, the virtual OS 47 operates based on a registry and file system which are included in the OS information stored in the removable storage unit 44, independently of the host OS 42.

In addition, the virtualization layer 46 sets a partial area of a host storage 48 to a virtual storage 49 that is a storage device dedicated to the virtual OS 47. More specifically, the virtualization layer 46 may set a partial area, obtained by partitioning the host storage 48, as a virtual storage 49. In this case, only the virtual OS 47 is allowed to access the virtual storage 49 by encrypting the virtual storage 49 so that it is impossible to access the virtual storage 49 through the host OS 42. It is possible to encrypt the virtual storage 49 from the host OS 42 by using an encryption key stored in the removable storage device 44. When the removable storage device 44 is removed from the host computer, the virtualization layer 46 is terminated. The virtual storage may be automatically deleted.

The virtual OS 47 generated in the procedure of executing applications may request operations of the applications 45 or request data necessary for the virtual OS 47 to be input and output. The virtualization layer 46 determines whether data is input to and output from the generated virtual storage 49 or a memory of the removable storage device 44 by analyzing a request for inputting and outputting data, from the virtual OS 47. That is, the virtualization layer 46 determines whether the data is read from or written to the generated virtual storage 49 or a memory of the removable storage device 44 by analyzing the request for inputting and outputting data, from the virtual OS 47.

More specifically, as a result of analyzing the request for inputting and outputting data, when time taken to store the data in the virtual storage 49 is smaller than time taken to store the data in the removable storage device 44, the virtualization layer 46 may increase a speed of inputting and outputting the data by storing the data in the virtual storage 49. In general, the storage device of the host computer has a larger capacity than the removable storage device. Accordingly, although a task is performed in a new virtual environment by using the removable storage device, in a case where a task on specific data is performed, it is possible to increase a speed of performing the task by storing the data in the storage device of the host computer instead of directly storing the data in the removable storage device.

However, when the removable storage device 44 is removed from the host computer, the host computer does not need to store the data any more. Accordingly, when the removable storage device 44 is removed from the host computer, the virtualization layer 46 deletes data stored in the virtual storage 49 or flushes the data to the removable storage device 44. In addition, even in a case where the removable storage device 44 is inserted into the host computer, the virtualization layer 46 may periodically delete data stored in the virtual storage device 49 or flushes the data to the removable storage device 44. In addition, the virtualization layer 46 may store data in the virtual storage 49 and generate information for representing that it is necessary to synchronize the removable storage device 44 with the virtual storage 49, at the same time.

Specifically, in a case where the data is a cache file such as an Internet temporary file, the removable storage device 44 no longer needs to store the data. Accordingly, the virtualization layer 46 periodically deletes the data stored in the virtual storage 49 or deletes the data when the removable storage device 44 is removed from the host computer. On the other hand, in a case where the data is related to a specific program, the removable storage device 44 needs to store the data. Accordingly, the virtualization layer 46 periodically flushes the data stored in the virtual storage 49 to the removable storage device 44 or flushes the data to the removable storage device 44 when the removable storage device 44 is removed from the host computer.

On the other hand, as a result of analyzing a request for inputting and outputting data, when time taken to store the data in the virtual storage 49 is equal to or longer than time taken to store the data in the removable storage device 44, the virtualization layer 46 may increase a speed of inputting and outputting the data by directly storing the data in the removable storage device 44. In this case, it takes too much time to store the data in the virtual storage 49, and the data stored in the virtual storage 49 has to be flushed to the removable storage device 44 when the removable storage device 44 is disconnected from the host computer. Accordingly, it takes an unnecessarily long time. Thus, the data is directly stored in the removable storage device 44.

However, the aforementioned description is only an exemplary embodiment. The virtualization layer 46 does not need to determine whether data is stored in the virtual storage 49 or the removable storage device 44 in response to a request for inputting and outing data from the virtual OS 47 according to the time taken to input and output data.

For example, if in a procedure for installing a specific program, data having a size less than a predetermined value is successively stored in the removable storage device 44, a lifetime of the removable storage device may be decreased due to frequently accessing the removable storage device 44. Accordingly, in this case, installation of the specific program may be completed by continuously storing the data in the virtual storage 49. At this time, in a case where installation of the specific program is completed, the data stored in the virtual storage 49 is periodically flushed to the removable storage device 44 or flushed to the removable storage device 44 when the removable storage device 44 is removed from the host computer. For example, in a case where the data is changed by editing a document by using an application, it is possible to directly store the data in the removable storage device 44.

However, the aforementioned description is only an exemplary embodiment. In a case where the user considers security of data an important factor, all the data generated in a procedure for performing a task may be stored in the removable storage device 44. In addition, in a case where the user considers performance of a task an important factor, data generated in a procedure for performing a task may be stored in the virtual storage 49. Accordingly, it is possible for the user to determine whether data is stored in the virtual storage 49 or in the removable storage device 44.

While the removable storage device 44 is being inserted into the host computer, the virtualization layer 46 synchronizes the virtual storage 49 with the removable storage device 44 by periodically checking the virtual storage 49. On the other hand, when the removable storage device 44 is removed from the host computer, the virtualization layer is terminated, and the virtual storage 49 may be automatically deleted.

Figure 5:
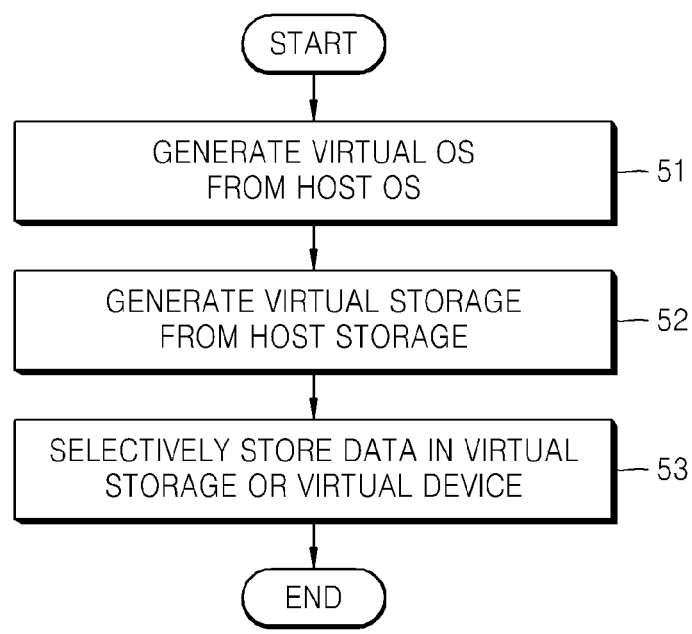
FIG. 5 is a flowchart illustrating a method of inputting and outputting data according to an exemplary embodiment of the present invention.

FIG. 5 is a flowchart illustrating a method of inputting and outputting data according to an exemplary embodiment of the present invention.

Referring to FIG. 5, the method of inputting and outputting data according to the present exemplary embodiment includes a sequence of operations performed in the system for inputting and outputting data of FIG. 4. Accordingly, although the aforementioned description on the system for inputting and outputting data shown in FIG. 4 is omitted, the description of the system for inputting and outputting data will be also applied to the method of inputting and outputting data according to the present exemplary embodiment.

In operation 51, the virtualization layer 46 generates the virtual OS 47 for managing at least one application 45 from the host OS 42.

In operation 52, the virtualization layer 46 generates a virtual storage that is accessible through the generated virtual OS 47 from the host storage 48.

In operation 53, the virtualization layer 46 selectively stores data in the virtual storage 49 or in the removable storage device 44 in response to a request for inputting and outputting data of the virtual OS 47.

In addition, the method of inputting and outputting data according to an exemplary embodiment of the present invention may further include a procedure of encrypting the virtual storage 49 by using unique information of the removable storage device or a key value included in the removable storage device. Accordingly, it is impossible to access the virtual storage 49 through the host OS 42. It is only possible to access the virtual storage 49 through the virtual OS 47.

In addition, the method of inputting and outputting data according to an exemplary embodiment of the present invention may further include a procedure of deleting data stored in the virtual storage 49 or flushing the data to the removable storage device by using the virtualization layer 46 when the removable storage device is disconnected from the host computer.

According to an exemplary embodiment of the present invention, it is possible to increase a speed of inputting and outputting data in a virtual environment by generating a virtual OS for the external device based on OS information stored in the external device connected to a host, setting a partial area of a storage of the host as a virtual storage for the external device, and storing the data in the virtual storage or a memory of the external device in response to a request for inputting and outputting the data from the virtual OS.

In addition, it is possible to increase a lifetime of the external device by reducing the number of times data is input and output to and from the external device by selectively storing data in the virtual storage or the memory of the external device. Accordingly, it is possible to reduce a price of a removable storage device by embodying the removable storage device by using a multi level cell (MLC) flash having a short lifetime and a low price.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices. The computer readable recording medium can also be distributed over network coupled computer systems so that the computer readable code is stored and executed in a distributed fashion.

The invention can also be embodied as computer readable codes transmitted via carrier waves (such as data transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the appended claims.

What is claimed is:

1. A method of inputting and outputting data, the method comprising:
generating a virtual operating system (OS) on a host OS of a host for a removable storage device, which is connected to the host, based on OS information stored in the removable storage device;
setting a partial area of a storage of the host as a virtual storage for the removable storage device;
selecting one of the virtual storage and a memory of the removable storage device for storing the data in response to a request for inputting and outputting the data from the virtual OS; and
storing the data in the selected one of the virtual storage and the memory of the removable storage device,
wherein the selecting of one of the virtual storage and the memory of the removable storage device for storing the data comprises:
determining whether the data is a temporary file that exists only while a program is being executed; and
selecting the virtual storage for storing the data when the data is the temporary file, or one of the virtual storage and the memory of the removable storage device by comparing a time taken to store the data in the virtual storage with a time taken to store the data in the memory when the data is not a temporary file.

2. The method of claim 1, wherein the data stored in the virtual storage is periodically deleted or flushed to the memory.

3. The method of claim 1, wherein the selecting one of the virtual storage and the memory of the removable storage device comprises:
determining whether a size of the data is less than a predetermined value; and
selecting one of the virtual storage and the memory based on a result of the determining.

4. The method of claim 3, wherein the data stored in the virtual storage is periodically deleted or flushed to the memory.

5. The method of claim 1, wherein the virtual storage is encrypted using unique information of the removable storage device or a key value included in the removable storage device so that the virtual storage is accessible only through the virtual OS.

6. The method of claim 1, further comprising deleting the data stored in the virtual storage or flushing the data stored in the virtual storage to the removable storage device, if the removable storage device is to be disconnected from the host.

7. The method of claim 1, wherein the OS information comprises at least one of a registry, a file system, a component, and a dynamic link library, and
wherein in the generating of the virtual OS, the virtual OS independent of an OS of the host is generated based on the OS information.

8. A computer-readable recording medium having embodied therein a computer program for executing a method of inputting and outputting data, the method comprising:
generating a virtual operating system (OS) on a host OS of a host for a removable storage device, which is connected to the host, based on OS information stored in the removable storage device;
setting a partial area of a storage of the host as a virtual storage for the removable storage device;
selecting one of the virtual storage and a memory of the removable storage device for storing the data in response to a request for inputting and outputting the data from the virtual OS; and
storing the data in the selected one of the virtual storage and the memory of the removable storage device,
wherein the selecting one of the virtual storage and the memory of the removable storage device for storing the data comprises:
determining whether the data is a temporary file that exists only while a program is being executed; and
selecting the virtual storage for storing the data when the data is the temporary file, or one of the virtual storage and the memory of the removable storage device by comparing a time taken to store the data in the virtual storage with a time taken to store the data in the memory when the data is not a temporary file.

9. A system for inputting and outputting data, the system comprising:
a host which includes a host operating system (OS) and a host storage; and
a removable storage device which is connectable to the host,
wherein the host comprises:
an application storage unit which stores at least one application;

a virtual environment unit which stores user preference information for setting a virtual environment and OS information;

a memory; and a virtualization layer which operates so that the data is stored in a virtual storage or the memory in response to a request for inputting and outputting the data of a virtual OS by generating the virtual OS from the host OS based on the OS information and setting a partial area of a storage of the host as the virtual storage, wherein the virtualization layer selects one of the virtual storage and the memory of the removable storage device to store the data in response to the request for inputting and outputting the data from the virtual OS, and stores the data in the selected one of the virtual storage and a memory of the removable storage device, and wherein the virtualization layer determines whether the data is a temporary file that exists only while a program is being executed, and selects the virtual storage for storing the data when the data is the temporary file, or one of the virtual storage and the memory of the removable storage device by comparing a time taken to store the data in the virtual storage with a time taken to store the data in the memory when the data is not a temporary file.

10. The apparatus of claim 9, wherein the virtualization layer determines whether a size of the data is less than a predetermined value and selects one of the virtual storage and the memory based on a result of the determination to store the data.

11. The apparatus of claim 9, further comprising an encryption key storage unit which stores a key value for encrypting the virtual storage.

12. The apparatus of claim 9, wherein the virtualization layer periodically synchronizes data stored in the virtual storage with data stored in the memory.

13. The apparatus of claim 9, wherein the virtualization layer periodically deletes data stored in the virtual storage or flushes the data stored in the virtual storage to the memory.

14. The apparatus of claim 9, wherein if the apparatus is to be disconnected from the host, the virtualization layer deletes data stored in the virtual storage or flushes the data stored in the virtual storage to the memory.

* * * * *